Jan. 17, 1967  W. T. FLEMING ETAL  3,298,616
FURNACE WALL MAINTENANCE NOZZLE
Filed Feb. 17, 1964  2 Sheets-Sheet 2
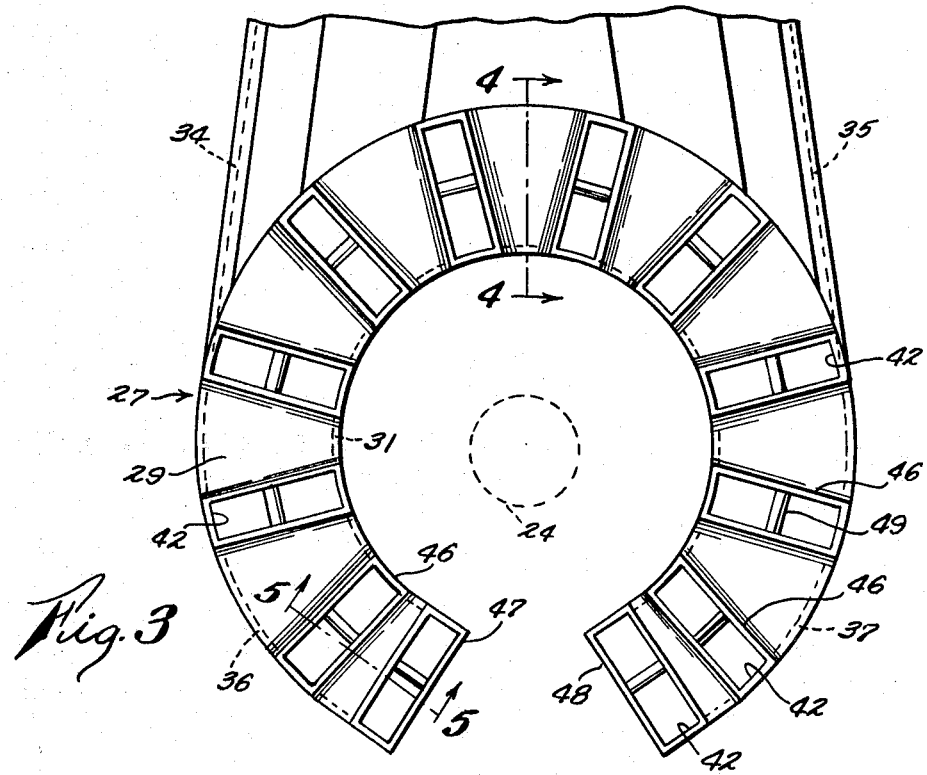
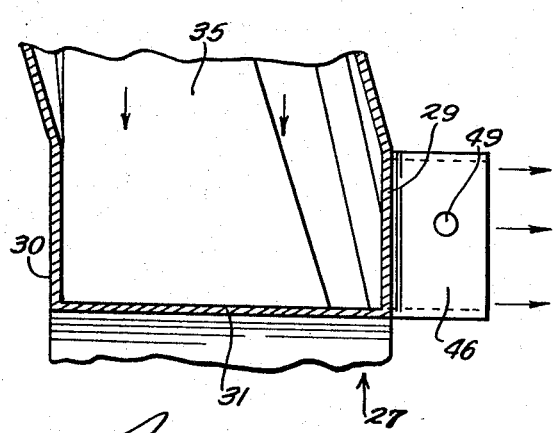
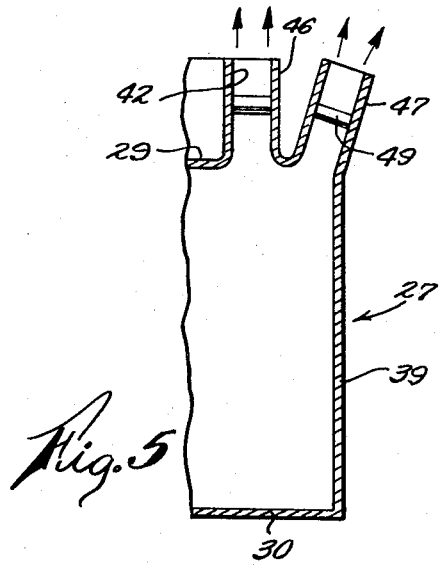
INVENTORS
William T. Fleming
James P. McHugh
BY
Walter S. Murray
ATTY.

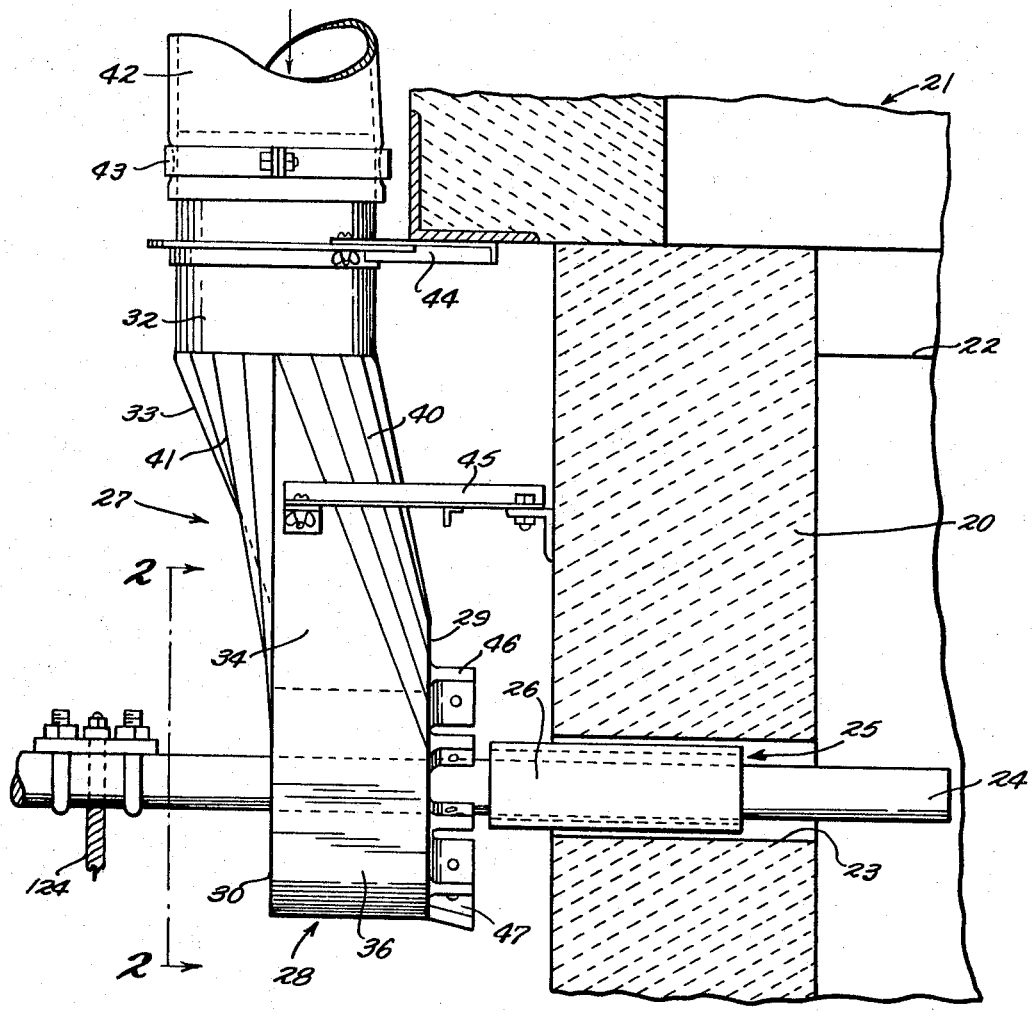
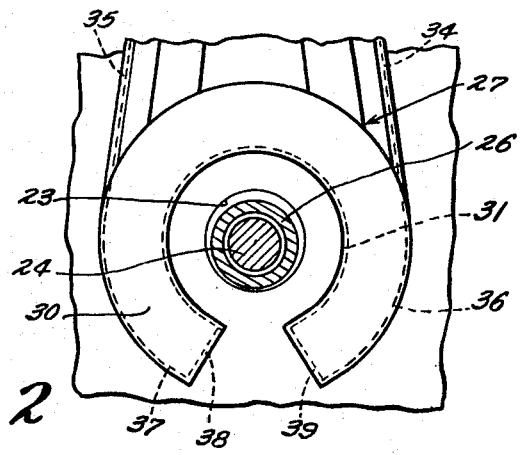

United States Patent Office 3,298,616
Patented Jan. 17, 1967

3,298,616
FURNACE WALL MAINTENANCE NOZZLE
William T. Fleming and James P. McHugh, Cincinnati, Ohio, assignors to The Kirk & Blum Manufacturing Co., Cincinnati, Ohio, a corporation of Ohio
Filed Feb. 17, 1964, Ser. No. 345,188
3 Claims. (Cl. 239—568)

The present invention relates to an improved nozzle construction adapted to direct cooling air streams against the external, critical surfaces of the refractory walls of electrically operated glass or metal furnaces, or the like, i.e. around the electrode openings therein, for the purpose of effectively retarding deterioration around said electrode areas of the refractory walls to thereby increase furnace life.

An object of the invention is to provide a novel header construction having a plurality of air discharge orifices so positioned thereon and each of a certain discharge configuration to provide for the efficient and effective maintenance of glass furnace refractory wall areas around the electrode openings therein.

Another object of the invention is to provide in a header construction having the foregoing characteristics an interrupted and generally circular series of radially disposed air discharge orifices that combine to effectively maintain the furnace wall area around the electrodes below the critical wall temperature to thereby retard erosion, corrosion and abrasion of the furnace wall area adjacent the electrode openings therein.

These and other objects will be attained by the preferred header construction illustrated in the accompanying drawings, wherein:

FIG. 1 is a fragmental view showing our nozzle structure in side elevation and illustrating the associated, critical furnace parts adjacent the nozzle in cross section.

FIG. 2 is a section taken on line 2—2 of FIG. 1.

FIG. 3 is an enlarged fragmental, front elevational view of our nozzle structure.

FIG. 4 is a section taken on line 4—4 of FIG. 3.

FIG. 5 is a section taken on line 5—5 of FIG. 3.

Referring now to FIG. 1 of the drawing there is shown in section an upstanding wall 20 made of heat refractory material for an electric furnace 21 in which various ingredients are to be melted to form liquid glass or metal charges that will have a liquid level 22 in the furnace. The furnace wall 20 has an opening 23 formed therethrough to receive an electrode 24 which is supported centrally in the opening 23 as by a fixture 25 that may include a sleeve 26 surrounding the central portion of the electrode. The outer, exterior end of the electrode is connected in any suitable manner to a source of electricity by a line 124.

The spaces between the furnace wall opening 23 and the sleeve 26 and between the sleeve 26 and the electrode 24 are sealed by the flow of liquid glass into the spaces and the hardening of the outer portions of the glass flow as its moves toward the exterior of the furnace wall, such hardening being materially hastened and maintained by our air nozzle device.

The temperature differential between the liquid charge and that portion of the refractory furnace wall around the electrode opening 23 is a critical one because the temperature of the molten glass is itself relatively high and the temperature of the wall area around the electrode opening is somewhat higher than other portions of the wall thus making the maintenance of the refractory wall area particularly difficult at and around said electrode openings. To widen the temperature differential and to efficiently reduce erosion, corrosion and abrasion of the refractory wall area of the furnace around the electrode openings we have provided a nozzle structure which will be fully described hereinafter and which is indicated in the several views of the drawings by the general reference numeral 27.

The nozzle structure 27 comprises a hollow, generally concavo-convex-shaped header 28 constructed to have opposed, semi-circular front and rear end walls 29 and 30, respectively, joined around their concaved edges by a semi-cylindrical wall 31. The hollow header 28 is in open communication with an upper, cylindrical air conduit 32 by means of a hollow, fabricated pipe section 33 having opposed side walls 34 and 35 each provided with circular lower end portions 36 and 37, respectively, that are marginally joined to the outer convexed edge portions of the front and rear walls 29 and 30. As best shown in FIG. 2 the opposed lower ends of the header are in spaced apart, confronting positions, said ends being closed by walls 38 and 39. The fabricated pipe section 33 has a front wall extending from the conduit 32 to the central convexed edge portion of the front wall 29 of the header and a rear wall 41 which is also connected to the conduit 32 and to the central convexed edge portion of the rear wall 30 of the header. With reference to FIG. 1 it will be noted that a flexible air hose 42 is secured to the upper end of the conduit 32 by a ring clamp 43 and that the header construction is removably mounted on the furnace wall by suitable brackets generally indicated by reference numerals 44 and 45.

The front wall 29 of the header has a circular series of air discharge orifices 46 projecting longitudinally therefrom to direct air jets onto the critical area of the furnace wall 20 around the electrode opening 23 therein and, as shown in FIG. 3, said orifices are narrow and have their long axes radiating from the center line of the header. The air discharge orifices in the header are uniformly spaced around the front wall 29 and all but the two end orifices in the series are formed by longitudinally extending bosses 46 positioned normal to the said front wall 29 of the header. The two end orifices of the header are located at the bottom of the header and are formed by bosses 47 and 48 that are positioned on the header at an acute angle with respect to the front wall 29 and are inclined toward one another. As shown in FIGS. 3–5 of the drawing, small pins 49 extend across opposed long sides of the bosses and act as reinforcing devices for the orifices.

It will therefore be understood that glass or metal furnaces are short lived due to the high operating temperature involved and that obsolete furnaces are periodically torn down and new ones rebuilt. Our header is so constructed that it may be readily mounted or removed from the critical furnace wall area around the heating electrodes by the expedient of making a few simple adjustments, namely, removing wing nuts on the brackets 44 and 45 and lifting the header vertically upwardly away from the furnace wall, the open configuration of header providing a clearance for insertion and removal of the header from around the positioned electrode arrangement.

Upon installation of our header and during operation of the glass or metal furnace air under pressure is forced into the header through the flexible hose 42, the conduit 32 and the fabricated connector portion 33. For highest cooling efficiency it is now thought that the air entering the conduit 32 should have a velocity of about 3500 ft. per minute to thereby maintain a pressure of 4.3 inches of mercury within the nozzle header. The jets of air forced through each orifice 46, 48 and 49 will then have a nozzle velocity of 8000 ft. per minute and this air will be directed against the furnace wall area adjacent to and completely around the electrode opening 13 therein.

The jets of air forced from the orifices formed by the bosses are ribbon-like in configuration and are controlled thereby to strike the critical furnace wall area perpendicularly with the exception of the ribbon-like air streams emitted from the end bosses 47 and 48 which strike the critical area at small angles. These ribbon-like streams striking the critical area perpendicularly are laterally disbursed and thus act to provide optimum cooling efficiency by our header completely over the critical area of the furnace refractory surrounding the electrode openings to thereby retard refractory erosion, corrosion and abrasion and thus increase the life of the entire glass or metal furnace.

What is claimed is:

1. An air nozzle of the class described comprising a hollow, concavo-convex shaped header having a semicircular front wall, a semi-circular rear wall spaced from the front wall, a semi-cylindrical inner wall joined at its side edges to the concaved edges of the front and rear walls, an air inlet conduit positioned centrally on the convex side of the header, a fabricated pipe section having a front wall connecting the conduit to the central convexed edge portion of the front wall, a rear pipe wall connecting the conduit to the central convexed edge portion of the rear wall, pipe side walls connecting the conduit to the outer convex edge portions of the front and rear walls, spaced apart end walls closing the confronting ends of the header, and a circular row of angularly spaced apart bosses projecting from the front wall of the header and each boss having a narrow air discharge orifice formed therethrough in communication with the interior of the header.

2. An air nozzle as set forth in claim 1 wherein the central bosses project at right angles from the header and the narrow orifices are radially elongated with respect to the axis of the header.

3. An air nozzle as set forth in claim 2 wherein the end bosses in the row have inclined orifices disposed at acute angles with respect to the axis of the header.

References Cited by the Examiner

UNITED STATES PATENTS

| | | | |
|---|---|---|---|
| 2,865,972 | 12/1958 | Augsburger | 13—17 |
| 3,155,759 | 11/1964 | Marshall | 13—25 |

FOREIGN PATENTS 79,216  10/1955  Netherlands.

EVERETT W. KIRBY, *Primary Examiner.*

JOSEPH V. TRUHE, *Examiner.*